(12) United States Patent
Oh

(10) Patent No.: US 9,946,955 B2
(45) Date of Patent: Apr. 17, 2018

(54) IMAGE REGISTRATION METHOD

(71) Applicant: Hanwha Techwin Co., Ltd., Changwon-si (KR)

(72) Inventor: Jaeyoon Oh, Changwon-si (JP)

(73) Assignees: HANWHA LAND SYSTEMS CO., LTD., Changwon-si (KR); Hanwha Techwin Co., Ltd., Changwon-si (KR)

( * ) Notice: Subject to any disclaimer, the term of this patent is extended or adjusted under 35 U.S.C. 154(b) by 224 days.

(21) Appl. No.: 14/883,158

(22) Filed: Oct. 14, 2015

(65) Prior Publication Data

US 2016/0117820 A1 Apr. 28, 2016

(30) Foreign Application Priority Data

Oct. 23, 2014 (KR) .................. 10-2014-0144290

(51) Int. Cl.
*G06T 7/00* (2017.01)
*G06K 9/62* (2006.01)
(Continued)

(52) U.S. Cl.
CPC .............. *G06K 9/6202* (2013.01); *G06T 7/33* (2017.01); *G06T 2207/10012* (2013.01);
(Continued)

(58) Field of Classification Search
CPC ........... G06T 7/003; G06T 7/337; G06T 7/33; G06T 2207/10048; G06T 2207/10012;
(Continued)

(56) References Cited

U.S. PATENT DOCUMENTS 5,915,033 A * 6/1999 Tanigawa ............... G01C 3/085
348/349
2003/0185340 A1 * 10/2003 Frantz ................ G01N 21/8806
378/57
(Continued)

FOREIGN PATENT DOCUMENTS

JP 2004-28811 A 1/2004
KR 10-2005-0063991 A 6/2005
(Continued)

*Primary Examiner* — Joseph Suh
(74) *Attorney, Agent, or Firm* — Sughrue Mion, PLLC

(57) ABSTRACT

An image registration method for registering a first image taken from a first viewpoint and a second image taken from a second viewpoint is disclosed. The method includes obtaining a first reference image by photographing a reference target from a first viewpoint; obtaining a second reference image by photographing the reference target from a second viewpoint; obtaining reference coordinate-difference values that indicate difference in coordinates of corresponding pixels between the first reference image and the second reference image; obtaining parallax registration-error values based on a distance of a photographing target from the first viewpoint and the second viewpoint; obtaining a registration result of a first image of the photographing target taken from the first viewpoint and the second image of the photographing target taken from the second viewpoint based on the reference coordinate-difference values; and correcting the registration result based on the parallax registration-error values.

7 Claims, 11 Drawing Sheets

(51) Int. Cl.
*G06T 7/33* (2017.01)
*H04N 13/02* (2006.01)
(52) U.S. Cl.
CPC ............ *G06T 2207/30196* (2013.01); *G06T 2207/30232* (2013.01); *H04N 13/0239* (2013.01)
(58) Field of Classification Search
CPC ............. H04N 13/0025; H04N 5/2258; H04N 13/0239; H04N 5/232; H04N 5/23296; H04N 13/0296; H04N 5/332; G06K 9/6201
See application file for complete search history.

(56) References Cited

U.S. PATENT DOCUMENTS

| | | | | |
|---|---|---|---|---|
| 2004/0189674 | A1* | 9/2004 | Zhang | H04N 1/04 345/629 |
| 2005/0110869 | A1* | 5/2005 | Tillotson | H04N 7/181 348/113 |
| 2005/0148859 | A1* | 7/2005 | Miga | G06K 9/00214 600/410 |
| 2006/0249679 | A1* | 11/2006 | Johnson | G01C 3/08 250/332 |
| 2007/0014347 | A1* | 1/2007 | Prechtl | H04N 5/232 375/240.01 |
| 2007/0201744 | A1* | 8/2007 | Sanami | H04N 1/3872 382/173 |
| 2008/0069405 | A1* | 3/2008 | Endo | G01B 11/002 382/106 |
| 2010/0302366 | A1* | 12/2010 | Zhao | B23Q 17/2233 348/142 |
| 2010/0328456 | A1* | 12/2010 | Alakarhu | G01C 3/08 348/139 |
| 2011/0044504 | A1* | 2/2011 | Oi | G06T 7/0042 382/103 |
| 2011/0115615 | A1* | 5/2011 | Luo | B60R 1/00 340/436 |
| 2011/0173565 | A1* | 7/2011 | Ofek | G09B 29/00 715/790 |
| 2012/0019614 | A1* | 1/2012 | Murray | H04N 13/0007 348/36 |
| 2012/0045099 | A1* | 2/2012 | Ishioka | G06K 9/00362 382/106 |
| 2012/0120264 | A1* | 5/2012 | Lee | G06T 7/20 348/208.4 |
| 2013/0004021 | A1* | 1/2013 | Nagaoka | B60R 1/00 382/103 |
| 2013/0050453 | A1* | 2/2013 | Bergstrom | H04N 5/2258 348/61 |
| 2013/0070108 | A1* | 3/2013 | Aerts | F01D 21/003 348/187 |
| 2013/0182080 | A1* | 7/2013 | Lin | H04N 13/0239 348/47 |
| 2014/0036085 | A1* | 2/2014 | Avignon | G01S 13/04 348/153 |

FOREIGN PATENT DOCUMENTS

| | | |
|---|---|---|
| KR | 10-2010-0008886 A | 1/2010 |
| KR | 10-1314259 B1 | 10/2013 |
| KR | 10-2014-0017222 A | 2/2014 |

* cited by examiner

IMAGE REGISTRATION METHOD

CROSS-REFERENCE TO THE RELATED APPLICATION

This application claims priority from Korean Patent Application No. 10-2014-0144290, filed on Oct. 23, 2014, in the Korean Intellectual Property Office, the disclosure of which is incorporated herein in its entirety by reference.

BACKGROUND

1. Field

Methods and apparatuses consistent with exemplary embodiments relate to an image registration method, and more particularly, to an image registration method of a camera system for registering a second image from a second camera to a first image from a first camera.

2. Description of the Related Art

In general, registration and fusion are necessary to change two images of the same photographing target into one image. The registration is a process for matching the positions of the same photographing target of two images with each other. The fusion is a process for adjusting the gradation of two original images with respect to a registration result.

A related art image registration method of a stereo camera system is summarized as follows.

A first reference image is obtained by photographing a reference photographing target at a reference distance by a first camera. Also, a second reference image is obtained by photographing the reference photographing target by a second camera.

Next, reference coordinate-difference values are obtained, which indicate difference of coordinates of corresponding pixels between the first reference image and the second reference image.

Then, the reference coordinate-difference values are used to obtain a registration result with respect to a photographing target. For example, the reference coordinate-difference values are used to set a two-dimensional (2D) homography matrix as a reference registration algorithm, and the 2D homography matrix is used to obtain a registration result with respect to a photographing target.

However, the conventional image registration method has a problem that an image registration accuracy is degraded depending on panning, tilting, and zooming states of a stereo camera.

Information disclosed in this Background section is known to the inventors before or during conception of the exemplary embodiments. Therefore, it may contain information that was not known to the public in this country at the time of conception.

SUMMARY

One or more exemplary embodiments provide an image registration method of a camera system and apparatus for registering images taken from different viewpoints.

One or more exemplary embodiments may resolve the problem of the related art that an image registration accuracy is degraded depending on panning, tilting, and zooming states of a stereo camera.

According to an aspect of an exemplary embodiment, there is provided an image registration method which includes: obtaining a first reference image by photographing a reference target from a first viewpoint; obtaining a second reference image by photographing the reference target from a second viewpoint; obtaining reference coordinate-difference values that indicate difference in coordinates of corresponding pixels between the first reference image and the second reference image; obtaining parallax registration-error values based on a distance of a photographing target from the first viewpoint and the second viewpoint; obtaining a registration result of a first image of the photographing target taken from the first viewpoint and the second image of the photographing target taken from the second viewpoint based on the reference coordinate-difference values; and correcting the registration result based on the parallax registration-error values.

A viewing angle, the distance of the photographing target, and a distance of the reference target may be applied equally to the first viewpoint and the second viewpoint, the reference coordinate-difference values and the parallax registration-error values may be calculated by number of pixels, the parallax registration-error values may comprise a registration-error value of an x-axis of a screen and a registration-error value of a y-axis of the screen, and the reference coordinate-difference values may comprise an x-axis difference value and a y-axis difference value.

The obtaining the reference coordinate-difference values may include: obtaining a first projected reference image by converting three-dimensional (3D) components of the first reference image into two-dimensional (2D) components; obtaining a second projected reference image by converting 3D components of the second reference image into 2D components; and calculating difference in coordinates of corresponding pixels between the first projected reference image and the second projected reference image.

The obtaining the parallax registration-error values may include: calculating a parallax registration-error value Ppara of the x-axis by an equation $$Ppara = \frac{\left(\frac{Dobj2}{Dobj1} - 1\right) \times Dcam \times Pfhd}{2 \times Dobj2 \times \tan\left(\frac{Tcam}{2}\right)},$$

wherein the distance of the reference target is Dobj1, the distance of the photographing target is Dobj2, a distance between the first viewpoint and the second viewpoint is Dcam, a number of pixels in a horizontal line of the first image or the second image is Pfhd, and the viewing angle is Tcam.

The obtaining the registration result may include: obtaining a 2D homography matrix for position conversion of the respective pixels of the second reference image using the first projected reference image and the second projected reference image; and registering the second image with the first image based on the obtained 2D homography matrix.

The registering the second image with the first image may include converting an x-coordinate value and a y-coordinate value of a pixel of the second image, wherein the converting may include: obtaining a first x-coordinate value and a first y-coordinate value as a registration result of the pixel by substituting an x-coordinate difference value and a y-coordinate difference value of the pixel for elements of the obtained 2D homography matrix; obtaining an x-coordinate correction value and a y-coordinate correction value of the pixel by substituting the registration-error value of the x-axis and the registration-error value of the y-axis for elements in the obtained the 2D homography matrix; obtaining a second x-coordinate value by correcting the first x-coordinate value based on the x-coordinate correction value; obtaining a second y-coordinate value by correcting the first y-coordinate value based on the y-coordinate correction value; and setting the second x-coordinate value and the second y-coordinate value as final coordinate values of the pixel.

The first image may be taken by a first camera and the second image may be taken by a second camera.

According to an aspect of another exemplary embodiment, there is provided a method for registering a plurality of images, the method including: determining a first homography matrix based on a first set of images of an object taken at different viewpoints aligned on a line which is at a first perpendicular distance from the object; obtaining a second set of images of the object which is at a second perpendicular distance from the line, the second set of images being taken at the different viewpoints; calculating a change in coordinates of the object between one of the first set of images and one of the second set of images, the one of the first set of images and the one of the second set of images being taken from a same viewpoint; obtaining correction values for registering the second set of images using a second homography matrix in which the change in coordinates substitutes for one or more elements of the first homography matrix; registering the second set of images using the first homography matrix; and correcting a result of the registering the second set of images using the correction values.

In the second homography matrix, a change in an x-axis coordinate of the change of coordinates may substitute for an element representing a difference of an x-axis coordinate among the first set of images, and a change in a y-axis coordinate of the change of coordinates may substitute for an element representing a difference of an y-axis coordinate among the first set of images.

Each of the first set of images and the second set of images may include a visible image and a thermal image.

The image registration method may further include: generating each of the first set of images and the second set of images simultaneously using multiple cameras installed in a multi-camera system, each of the multiple cameras having the different viewpoints.

According to an aspect of another exemplary embodiment, there is provided an apparatus comprising: a memory configured to store a program; and a processor configured to register a plurality of images by executing the program, wherein the program includes instructions implementing the operations of: determining a first homography matrix based on a first set of images of an object taken at different viewpoints aligned on a line which is at a first perpendicular distance from the object; obtaining a second set of images of the object which is at a second perpendicular distance from the line, the second set of images being taken at the different viewpoints; calculating a change in coordinates of the object between one of the first set of images and one of the second set of images, the one of the first set of images and the one of the second set of images being taken from a same viewpoint; obtaining correction values for registering the second set of images using a second homography matrix in which the change in coordinates substitutes for one or more elements of the first homography matrix; registering the second set of images using the first homography matrix; and correcting a result of the registering the second set of images using the correction values.

In the second homography matrix, a change in an x-axis coordinate of the change of coordinates may substitute for an element representing a difference of an x-axis coordinate among the first set of images, and a change in a y-axis coordinate of the change of coordinates may substitute for an element representing a difference of an y-axis coordinate among the first set of images.

Each of the first set of images and the second set of images may include a visible image and a thermal image.

The apparatus may further include: multiple cameras configured to generate each of the first set of images and the second set of images simultaneously, each of the multiple cameras having the different viewpoints.

According to one or more exemplary embodiments, the reference coordinate-difference values are used to obtain the registration result with respect to the photographing target, and the parallax registration-error values are used to correct the obtained registration result.

Thus, the image registration accuracy is not degraded even when the distance of the photographing target changes with respect to the first camera and the second camera. Accordingly, the related art problem of the image registration accuracy degrading according to panning, tilting, and zooming states of the stereo camera may be resolved.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION OF THE EXEMPLARY EMBODIMENTS

Figure 1:
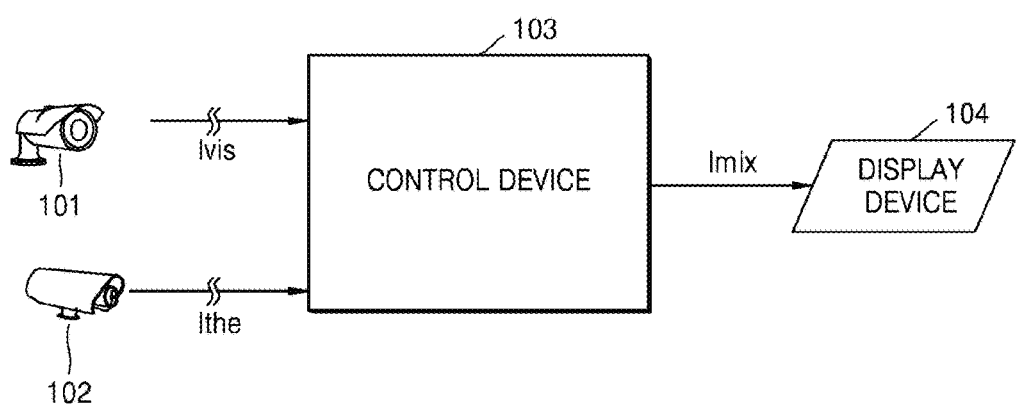
FIG. 1 is a diagram illustrating a camera system for performing an image registration method according to an exemplary embodiment.

Reference will now be made in detail to exemplary embodiments, examples of which are illustrated in the accompanying drawings, wherein like reference numerals refer to like elements throughout. In this regard, the exemplary embodiments may have different forms and should not be construed as being limited to the descriptions set forth herein. The exemplary embodiments are described below with reference to the figures. As used herein, the term "and/or" includes any and all combinations of one or more of the associated listed items.

The following descriptions and the accompanying drawings are for understanding operations according to the inventive concept, and descriptions of well-known features, which may be easily implemented by those of ordinary skill in the art, will be omitted for conciseness.

Also, the specification and the drawings are not intended to limit the scope of the inventive concept, and the scope of the inventive concept is to be defined by the appended claims. For the best understanding of the inventive concept, the terms used herein are to be interpreted as having meanings and concepts that are consistent with the inventive concept. Hereinafter, exemplary embodiments will be described in detail with reference to the accompanying drawings.

FIG. 1 is a diagram illustrating a camera system for performing an image registration method according to an exemplary embodiment.

Referring to FIG. 1, in the camera system, the camera system may include a first camera 101 and a second camera 102. The first and second cameras 101 and 102 may be cameras having different characteristics and configured to provide image information by photographing the same scene. For example, the first camera 101 may be a thermal imaging camera and the second camera 102 may be a visible light camera. The visible light camera as a first camera 101 outputs a first image Ivis, which is a visible image of the subject, to the control device 103, i.e., an image registration device. The thermal imaging camera as a second camera 102 outputs a second image Ithe, which is a thermal image capturing the temperature of a subject, to the control device 103.

In another exemplary embodiment, the first camera 101 and the second camera 102 may be incorporated into the control device 103.

Exemplary embodiments described herein assume two cameras constituting the camera system of FIG. 1 and two images captured by the two cameras respectively for image registration, but the number of cameras and the number of images may change according to other exemplary embodiments and is not limited thereto. For example, more than two cameras may be used to take a plurality of respective images to register, according to another exemplary embodiment. Alternatively, one camera may be used to take a plurality of images to be registered from different viewpoints, according to another exemplary embodiment.

A control device 103 performs registration and fusion with regard to the first image Ivis from the first camera 101 and the second image Ithe from the second camera 102. The registration is a process for matching the positions or coordinates of a photographing target in the two images with each other. The fusion is a process for adjusting the gradation of the two images with respect to a registered image which is a registration result. A registration method of the control device 103 will be described below.

After processing registration and fusion, the control device 103 provides a result image Imix to a display device 104 or client terminals. Further, the control device 103 may store the first image Ivis, the second image Ithe, or the result image Imix in a storage, e.g., a memory.

An image registration method of the present exemplary embodiment performed by the control device 103 will be described below.

Figure 2:
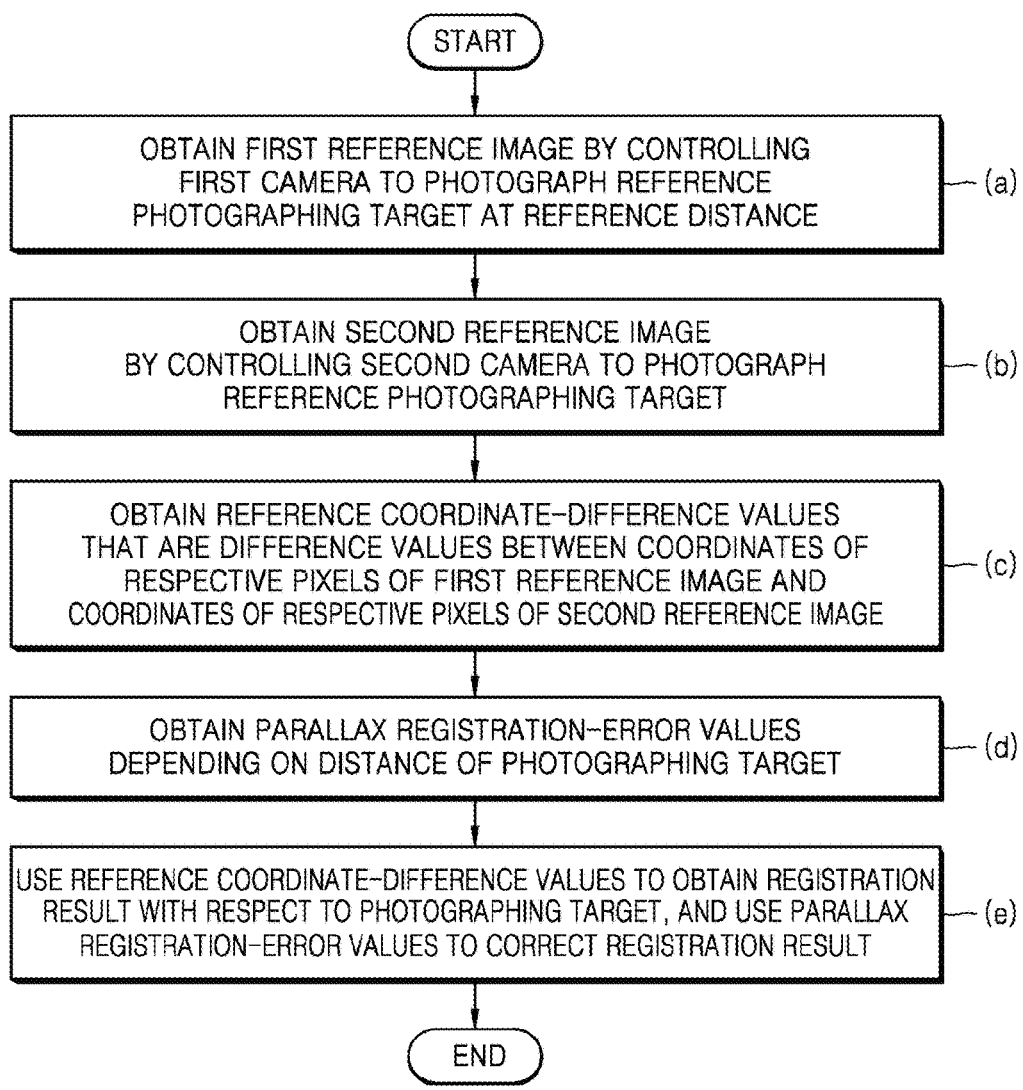
FIG. 2 is a flowchart illustrating an image registration method according to an exemplary embodiment.

FIG. 2 is a flowchart illustrating an image registration method according to an exemplary embodiment. The image registration method of the exemplary embodiment will be described below with reference to FIGS. 1 and 2.

In operation (a), the control device 103 obtains a first reference image by controlling the first camera to photograph a reference photographing target at a reference distance. The reference photographing target may be a check board having a regular grid pattern.

In operation (b), the control device 103 obtains a second reference image by controlling the second camera to photograph the reference photographing target at the reference distance.

In operation (c), the control device 103 obtains reference coordinate-difference values that indicate coordinate difference of pixels between the first reference image and the second reference image. The reference coordinate-difference values may include an x-axis difference value and a y-axis difference value with respect to each pixel.

In operation (d), the control device 103 obtains parallax registration-error values which depend on the distance of a photographing target. The parallax registration-error values may include a registration-error value of an x-axis as a horizontal axis on a screen and a registration-error value of a y-axis as a vertical axis on the screen. The reference coordinate-difference values and the parallax registration-error values may be calculated by number of pixels.

In operation (e), the control device 103 uses the reference coordinate-difference values to obtain the registration result with respect to the photographing target, and uses the parallax registration-error values to correct the obtained registration result.

Thus, the image registration accuracy does not degrade even when the distance of the photographing target changes with respect to the first camera 101 and the second camera 102. As a result, the problem that an image registration accuracy is degraded depending on panning, tilting, and zooming states of the stereo camera may be resolved.

In the event that the first camera 101 and the second camera 102 constitute a stereo camera, a viewing angle, the distance of the photographing target, and the reference distance may be shared between the first camera 101 and the second camera 102.

Figure 3:
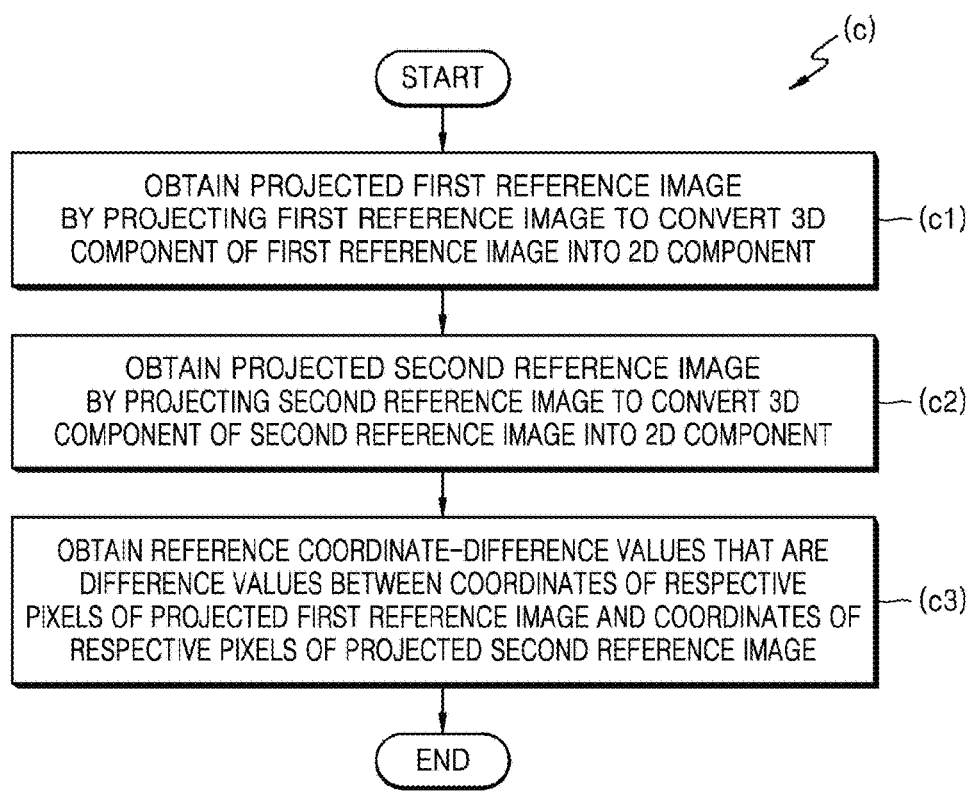
FIG. 3 is a flowchart illustrating a process of obtaining a difference in coordinates of pixels between reference images according to an exemplary embodiment.

FIG. 3 is a flowchart illustrating the operation (c) of FIG. 2 in more detail, according to an exemplary embodiment.

Figure 4:
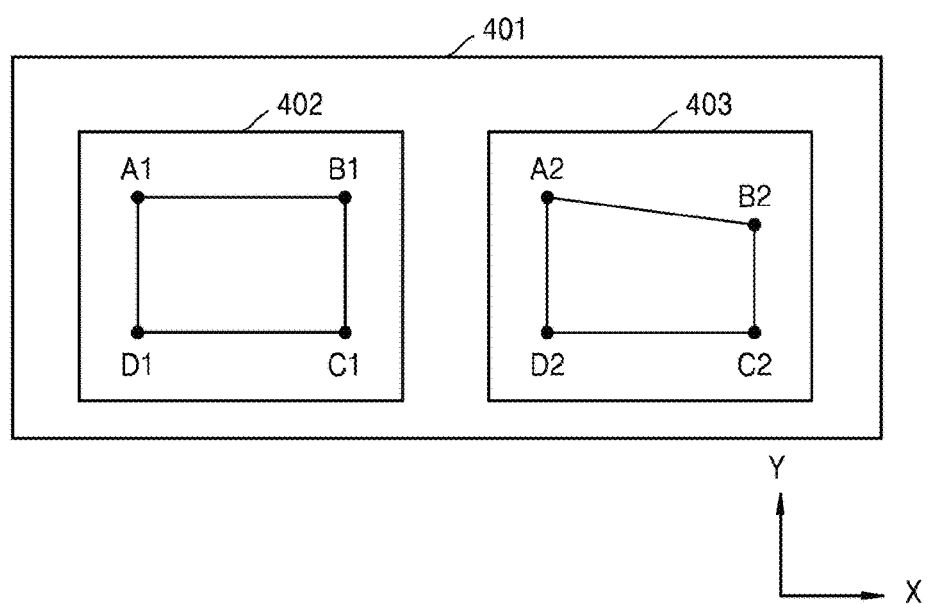
FIG. 4 is a diagram illustrating reference images according to an exemplary embodiment.

FIG. 4 is a diagram illustrating first and second reference images 402 and 403 obtained by operations (c1) and (c2) of FIG. 3, according to an exemplary embodiment.

An exemplary embodiment of operation (c) of FIG. 2 will be described below with reference to FIGS. 1, 3, and 4.

In operation (c1), the control device 103 obtains a projected first reference image 402 by projecting the first reference image to convert a three-dimensional (3D) component of the first reference image into a two-dimensional (2D) component. Since a projection method for converting a 3D component of an image into a 2D component is well-known to a person of ordinary skill in the art, a detailed description thereof is omitted.

In operation (c2), the control device 103 obtains a projected second reference image 403 by projecting the second reference image to convert a 3D component of the second reference image into a 2D component.

In operation (c3), the control device 103 obtains the reference coordinate-difference values that are the difference values between the coordinates of the respective pixels of the projected first reference image 402 and the coordinates of the respective pixels of the projected second reference image 403.

In FIG. 4, a reference numeral 401 denotes a 2D projection plane. In FIG. 4, a feature point A1 corresponds to A2, a feature point B1 corresponds to B2, a feature point C1 corresponds to C2, and a feature point D1 corresponds to D2. The positions of the corresponding feature points in the two images are different because a depth component is reflected in the process of converting the 3D component into the 2D component.

In FIG. 4, eight linear equations may be derived using eight feature points A1 to D2. In operation (e) of FIG. 2, using the linear equations, a 2D homography matrix may be set as a suitable reference registration algorithm. This 2D homography matrix may be used in operation (e) of FIG. 2. Since a method for setting the 2D homography matrix for image registration is well-known to a person of ordinary skill in the art, a detailed description thereof is omitted.

Figure 5:
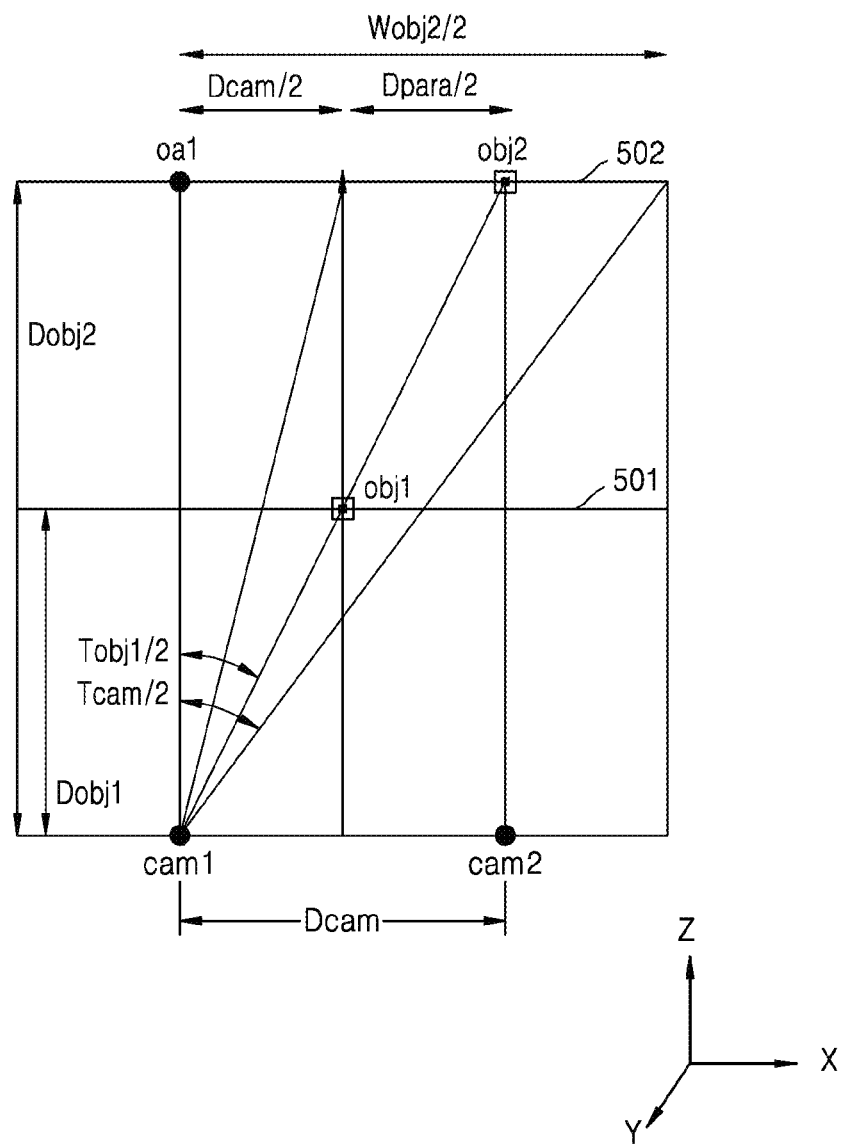
FIG. 5 is a diagram illustrating a process of obtaining parallax registration values according to an exemplary embodiment.

FIG. 5 is a diagram illustrating the operation (d) of FIG. 2 in more detail, according to an exemplary embodiment.

In FIG. 5, cam1 denotes a first camera, cam2 denotes a second camera, 501 denotes an X-Y plane at a reference distance, 502 denotes an X-Y plane at a target distance, obj1 denotes a photographing target at the reference distance, obj2 denotes the photographing target to be applied, Dobj1 denotes the reference distance, Dobj2 denotes the distance of the photographing target to be applied, oa1 denotes an intersection of an optical axis of the first camera and an X-Y plane at the distance of the photographing target to be applied, Dcam denotes a distance between the cameras, Dpara denotes a parallax distance on the x-axis, Tcam denotes a camera viewing angle, and Tobj1 denotes a viewing angle of the photographing target at the reference distance.

FIG. 5 illustrates a method of obtaining a registration-error value of the x-axis by the number of pixels. A registration-error value of the y-axis to be calculated in the same manner. Thus, a method of obtaining a registration-error value Ppara of the x-axis will be described below with reference to FIG. 5 and a description of obtaining a registration-error value Ppara of the y-axis is omitted.

When a number of pixels of a horizontal line of an image from the camera cam1 or cam2 is Pfhd, an actual horizontal distance of the photographing target obj2 corresponding to the number of pixels of the horizontal line is Wobj2, and a registration-error value of the x-axis to be calculated by number of pixels is Ppara, Equation 1 below is established.

$$Wobj2{:}Dpara = Pfhd{:}Ppara \qquad \text{Equation 1}$$

Referring to FIG. 5, an actual horizontal distance Wobj2 corresponding to the number of pixels of a horizontal line of an image from the camera cam1 or cam2 may be calculated by Equation 2 below.

$$Wobj2 = 2 \times Dobj2 \times \tan\left(\frac{Tcam}{2}\right) \qquad \text{Equation 2}$$

When Equation 2 is substituted in Equation 1, Equation 3 below is established.

$$2 \times Dobj2 \times \tan\left(\frac{Tcam}{2}\right){:}Dpara = Pfhd{:}Ppara \qquad \text{Equation 3}$$

When Equation 3 is summarized with respect to Ppara, Equation 4 below is established.

$$Ppara = \frac{Dpara \times Pfhd}{2 \times Dobj2 \times \tan\left(\frac{Tcam}{2}\right)} \qquad \text{Equation 4}$$

Referring to FIG. 5, Equation 5 below may be derived.

$$Dobj1{:}\frac{Dcam}{2} = Dobj2{:}\left(\frac{Dcam}{2} + \frac{Dpara}{2}\right) \qquad \text{Equation 5}$$

When Equation 5 is summarized with respect to the parallax distance Dpara of the x-axis, Equation 6 below is established.

$$Dpara = \left(\frac{Dobj2}{Dobj1} - 1\right) \times Dcam \qquad \text{Equation 6}$$

Thus, when Equation 6 is substituted in Equation 4, the registration-error value Ppara of the x-axis to be calculated by number of pixels may be obtained by Equation 7 below.

$$Ppara = \frac{\left(\frac{Dobj2}{Dobj1} - 1\right) \times Dcam \times Pfhd}{2 \times Dobj2 \times \tan\left(\frac{Tcam}{2}\right)} \qquad \text{Equation 7}$$

Figure 6:
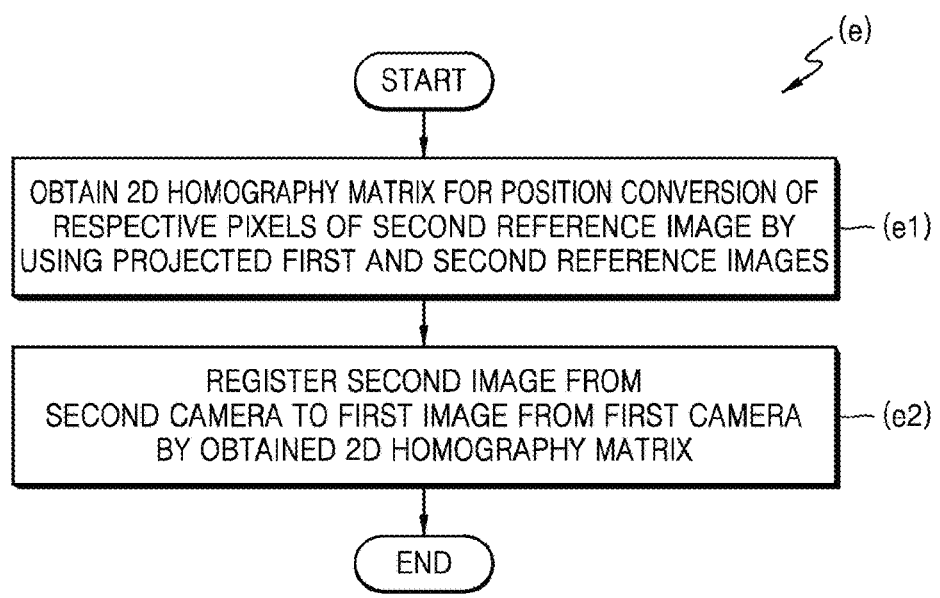
FIG. 6 is a flowchart illustrating a process of registering images using a homography matrix according to an exemplary embodiment.

FIG. 6 is a flowchart illustrating the operation (e) of FIG. 2 in more detail, according to an exemplary embodiment.

An exemplary embodiment of operation (e) will be described below with reference to FIGS. 1, 2, 4, and 6.

In operation (e1), the control device 103 obtains a 2D homography matrix for position conversion of pixels of the second reference image 403 using the projected first and second reference images 402 and 403. Operation (e1) may be performed before operation (d).

In operation (e2), the control device 103 registers the second image Ithe from the second camera 102 to the first image Ivis from the first camera 101 using the obtained 2D homography matrix.

In the case of a stereo camera in which the planes of the first and second reference images Ivis and Ithe are parallel to each other and have a uniform distance therebetween, a 2D homography matrix H for position conversion of the respective pixels of the second reference image 403 may be obtained as Equation 8 below.

$$H = \begin{bmatrix} 1 & 0 & h13 \\ 0 & 1 & h23 \\ 0 & 0 & 1 \end{bmatrix} \qquad \text{Equation 8}$$

In Equation 8, a variable element h13 denotes an x-coordinate difference value of a target pixel and h23 denotes a y-coordinate difference value of the target pixel, between the first and second reference images. Therefore, x-coordinate values and y-coordinate values of a registration result may be obtained using Equation 8.

Figure 7:
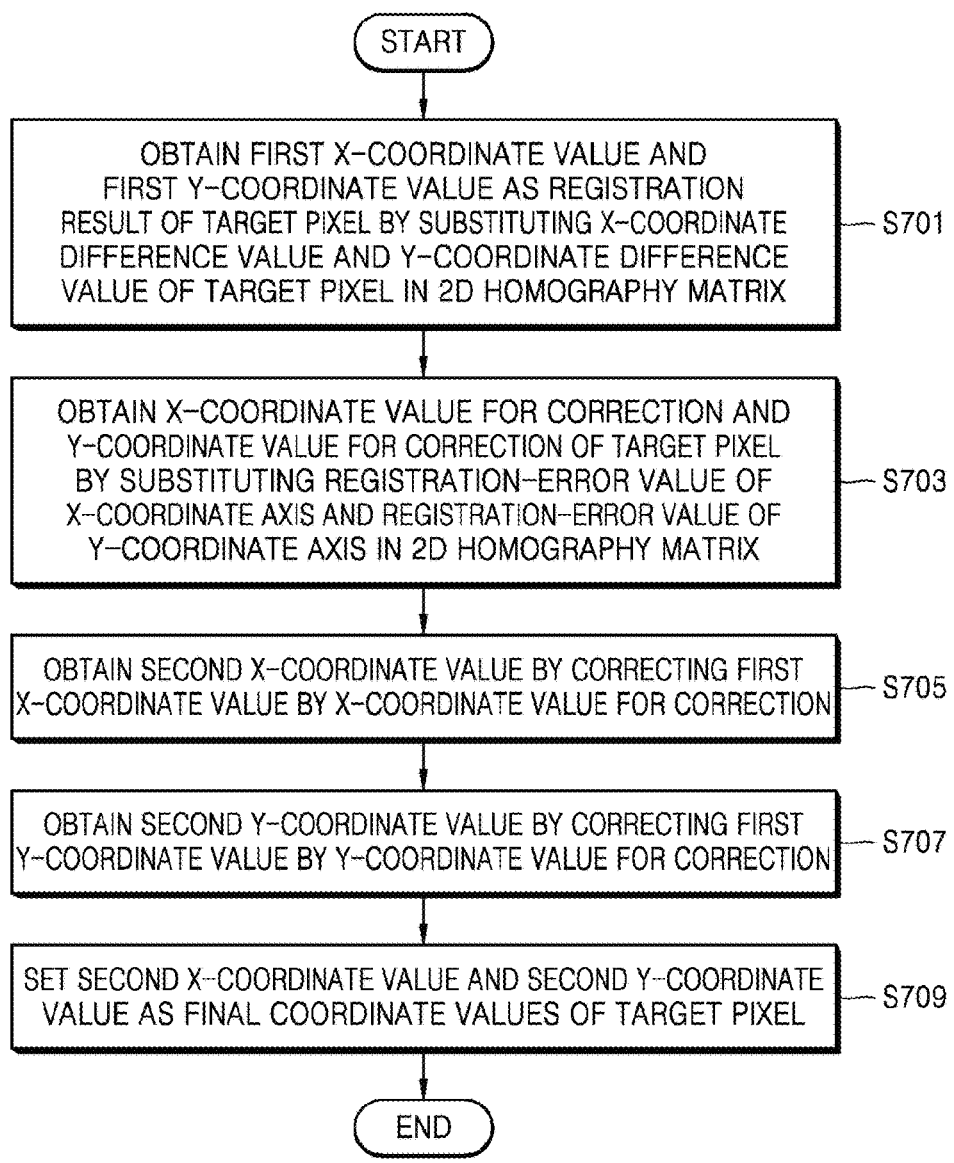
FIG. 7 is a flowchart illustrating a process of converting an x-coordinate value and a y-coordinate value of pixels, according to an exemplary embodiment.

FIG. 7 is a flowchart illustrating a process of converting an x-coordinate value and a y-coordinate value of a pixel of the second image Ithe of a photographing target according to an exemplary embodiment. This process will be described below with reference to FIGS. 1, 2, 4, and 7.

In operation S701, the control device 103 obtains a first x-coordinate value and a first y-coordinate value as a registration result of the target pixel by substituting an x-coordinate difference value and a y-coordinate difference value of the target pixel for the variables in the 2D homography matrix. Specifically, the x-coordinate difference value substitutes for h13 and the y-coordinate difference value substitutes for h23 in the matrix of Equation 8.

In operation S703, the control device 103 obtains an x-coordinate correction value and a y-coordinate correction value of the target pixel by substituting the registration-error value (Ppara in Equation 7) of the x-axis and the registration-error value of the y-axis for the variables in the 2D homography matrix (operation S703). Specifically, x-coordinate correction value y-coordinate correction value the registration-error value (Ppara in Equation 7) of the x-axis substitutes for h13 and the registration-error value of the y-axis substitutes for h23 in the matrix of Equation 8.

The registration-error value (Ppara in Equation 7) of the x-axis and the registration-error value of the y-axis may be applied commonly to all the pixels. In other words, the x-coordinate correction value and the y-coordinate correction value may be applied commonly to all the pixels. Thus, operation S703 need not be repeated for every pixel and may be performed only once.

In operation S705, the control device 103 obtains a second x-coordinate value by correcting the first x-coordinate value using the x-coordinate correction value.

In operation S707, the control device 103 obtains a second y-coordinate value by correcting the first y-coordinate value using the y-coordinate correction value.

In operation S709, the control device 103 sets the second x-coordinate value and the second y-coordinate value as the final coordinate values of the target pixel.

According to the image registration method of one or more exemplary embodiments described above, the reference coordinate-difference values are used to obtain the registration result with respect to the photographing target, and the parallax registration-error values are used to correct the obtained registration result.

Thus, the image registration accuracy does not degrade even when the distance of the photographing target, e.g., Dobj in FIG. 5, changes with respect to the first camera and the second camera. Accordingly, a problem that an image registration accuracy is degraded depending on panning, tilting, and zooming states of the stereo camera may be resolved.

Figure 8:
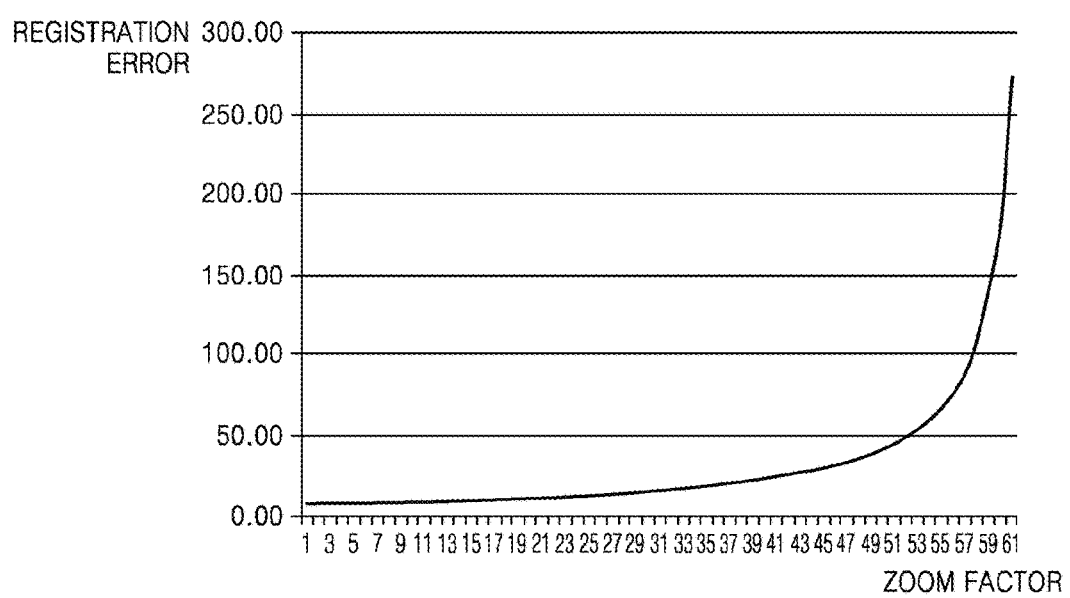
FIG. 8 is a graph illustrating a curve of x-axis parallax registration-error values occurring with respect to a zoom factor applied commonly to two cameras, according to an exemplary embodiment.

FIG. 8 is a graph illustrating an x-axis parallax registration-error values occurring with respect to a zoom factor applied commonly to two cameras according to an exemplary embodiment.

Referring to FIG. 8, it may be seen that the parallax registration-error value increases exponentially with respect to the zoom factor applied commonly to two cameras, i.e., the distance of the photographing target, e.g., Dobj2 in FIG. 5. Thus, the image registration accuracy may be improved by correcting the parallax registration-error value in the image registration process.

Figure 9:
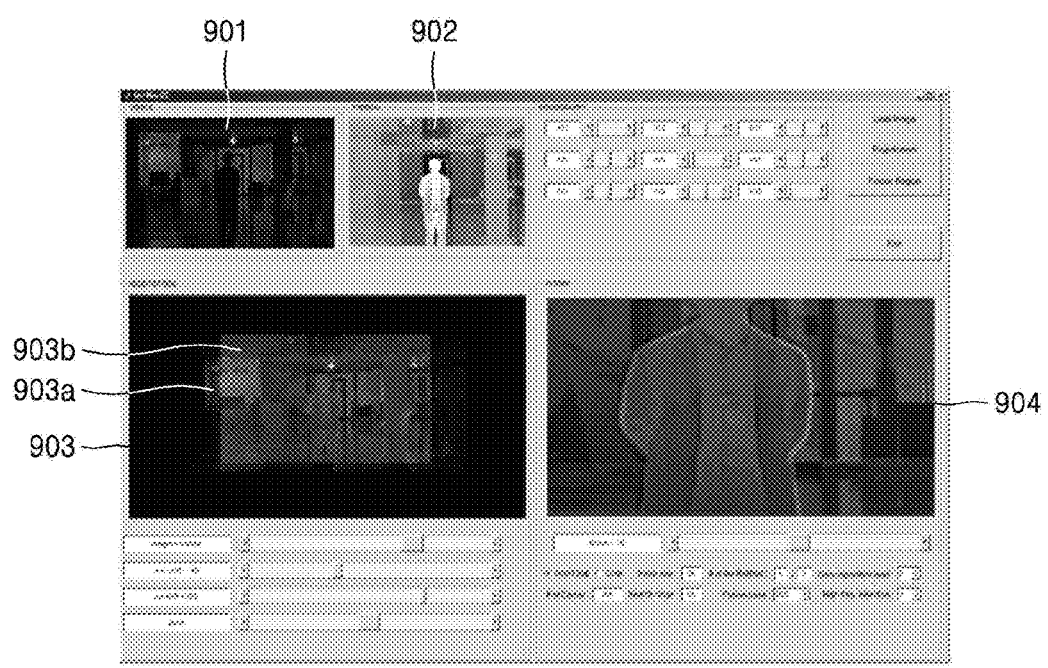
FIG. 9 is a screen shot illustrating a result of registration and fusion for a photographing target when a registration algorithm derived for a reference distance is applied to the photographing target at the reference distance, according to an exemplary embodiment.

FIG. 9 illustrates a result of registration and fusion for a photographing target when a registration algorithm, e.g., Equation 8, for a reference distance of 20 m (meter) is applied to the photographing target at a distance of 20 m.

In FIG. 9, a reference numeral 901 denotes a visible image, e.g., Ivis in FIG. 1, as the first image, 902 denotes a thermal image, e.g., Ithe in FIG. 1, as the second image, 903 denotes registered images, 903a denotes a visible image as the first image immediately before the registration, 903b denotes a thermal image as the second image immediately before the registration, and 904 denotes a fused image.

FIG. 9 shows that a result of registration and fusion for the photographing target is good when a registration algorithm, e.g., Equation 8, for a reference distance of 20 m is applied to the photographing target at a distance of 20 m.

Figure 10:
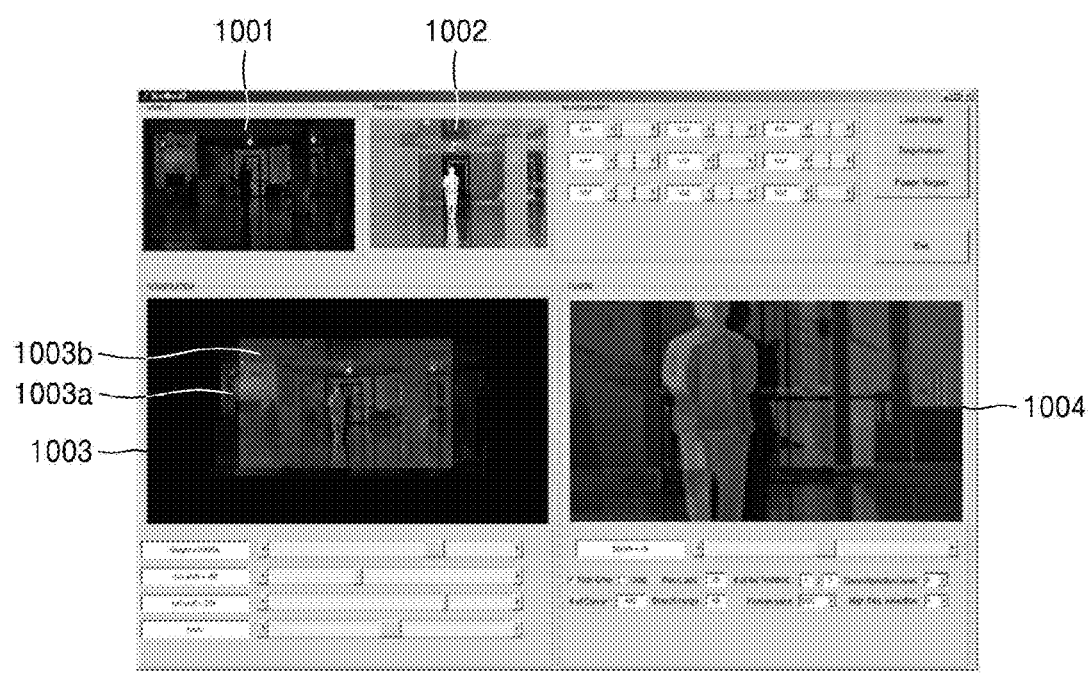
FIG. 10 is a screen shot illustrating a result of registration and fusion for a photographing target when a registration algorithm derived for a reference distance is applied to the photographing target at a distance longer than the reference without correcting the result.

FIG. 10 illustrates a result of relate art registration and fusion for a photographing target when a registration algorithm, e.g., Equation 8, for a reference distance of 20 m is applied to the photographing target at a distance of 40 m.

In FIG. 10, a reference numeral 1001 denotes a visible image, e.g., Ivis in FIG. 1, as the first image, 1002 denotes a thermal image, e.g., Ithe in FIG. 1, as the second image, 1003 denotes registered images, 1003a denotes a visible image as the first image immediately before the registration, 1003b denotes a thermal image as the second image immediately before the registration, and 1004 denotes a fused image.

FIG. 10 shows that a result of related art registration and fusion for the photographing target is not as accurate as the result of FIG. 9 because a registration algorithm, e.g., Equation 8, for a reference distance of 20 m is applied to the photographing target at a distance of 40 m.

Figure 11:
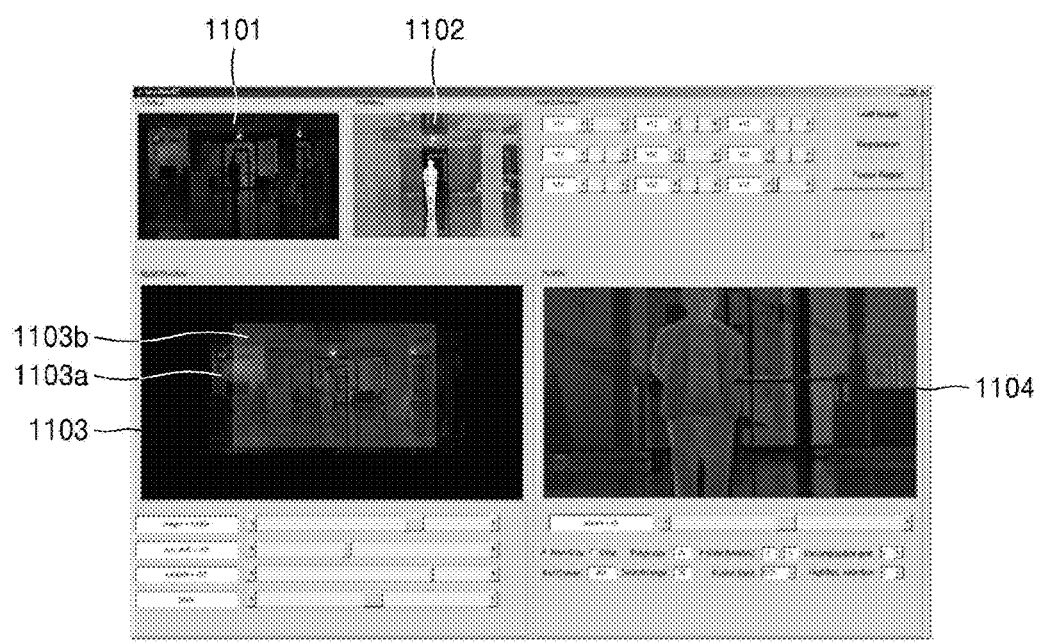
FIG. 11 is a screen shot illustrating a result of registration and fusion for a photographing target when a registration algorithm derived for a reference distance is applied to the photographing target at a distance longer than the reference, according to an exemplary embodiment.

FIG. 11 illustrates a result of registration and fusion for a photographing target when a registration algorithm for a reference distance of 20 m is applied to the photographing target at a distance of 40 m, according to an exemplary embodiment.

In FIG. 11, a reference numeral 1101 denotes a visible image, e.g., Ivis in FIG. 1, as the first image, 1102 denotes a thermal image, e.g., Ithe in FIG. 1, as the second image, 1103 denotes registered images, 1103a denotes a visible image as the first image immediately before the registration, 1103b denotes a thermal image as the second image immediately before the registration, and 1104 denotes a fused image.

FIG. 11 shows that the result of registration and fusion for the photographing target is improved compared to the result of FIG. 10 because the parallax registration-error value is corrected in the image registration process.

As described above, according to the image registration method of one or more exemplary embodiments, the reference coordinate-difference values are used to obtain the registration result with respect to the photographing target, and the parallax registration-error values are used to correct the obtained registration result.

Thus, the image registration accuracy may be prevented from being degraded even when the distance of the photographing target changes with respect to the first camera and the second camera. Accordingly, a problem that image registration accuracy is degraded because of panning, tilting, and zooming states of the stereo camera may be resolved.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. An image registration method comprising:
    obtaining a first reference image by photographing a reference target from a first viewpoint;
    obtaining a second reference image by photographing the reference target from a second viewpoint;
    obtaining reference coordinate-difference values that indicate difference in coordinates of corresponding pixels between the first reference image and the second reference image;
    obtaining parallax registration-error values based on a distance of a photographing target from the first viewpoint and the second viewpoint;
    obtaining a registration result of a first image of the photographing target taken from the first viewpoint and a second image of the photographing target taken from the second viewpoint based on the reference coordinate-difference values; and
    correcting the registration result based on the parallax registration-error values,
    wherein the first viewpoint is different from the second viewpoint, and
    wherein the registration result is obtained after the parallax registration-error values are obtained.

2. The image registration method of claim 1, wherein
    a viewing angle, the distance of the photographing target, and a distance of the reference target are applied equally to the first viewpoint and the second viewpoint,
    the reference coordinate-difference values and the parallax registration-error values are calculated by number of pixels,
    the parallax registration-error values comprise a registration-error value of an x-axis of a screen and a registration-error value of a y-axis of the screen, and
    the reference coordinate-difference values comprise an x-axis difference value and a y-axis difference value.

3. The image registration method of claim 2, wherein the obtaining the reference coordinate-difference values comprises:
    obtaining a first projected reference image by converting three-dimensional (3D) components of the first reference image into two-dimensional (2D) components;
    obtaining a second projected reference image by converting 3D components of the second reference image into 2D components; and
    calculating difference in coordinates of corresponding pixels between the first projected reference image and the second projected reference image.

4. The image registration method of claim 3, wherein the obtaining the parallax registration-error values comprises:
    calculating a parallax registration-error value Ppara of the x-axis by an equation $$Ppara = \frac{\left(\frac{Dobj2}{Dobj1} - 1\right) \times Dcam \times Pfhd}{2 \times Dobj2 \times \tan\left(\frac{Tcam}{2}\right)},$$

wherein the distance of the reference target is Dobj1, the distance of the photographing target is Dobj2, a distance between the first viewpoint and the second viewpoint is Dcam, a number of pixels in a horizontal line of the first image or the second image is Pfhd, and the viewing angle is Tcam.

5. The image registration method of claim 3, wherein the obtaining the registration result comprises:
    obtaining a 2D homography matrix for position conversion of the respective pixels of the second reference image using the first projected reference image and the second projected reference image; and
    registering the second image with the first image based on the obtained 2D homography matrix.

6. The image registration method of claim 5, wherein the registering the second image with the first image comprises converting an x-coordinate value and a y-coordinate value of a pixel of the second image,
    wherein the converting comprises:
    obtaining a first x-coordinate value and a first y-coordinate value as a registration result of the pixel by substituting an x-coordinate difference value and a y-coordinate difference value of the pixel for elements of the obtained 2D homography matrix;
    obtaining an x-coordinate correction value and a y-coordinate correction value of the pixel by substituting the registration-error value of the x-axis and the registration-error value of the y-axis for elements in the obtained the 2D homography matrix;
    obtaining a second x-coordinate value by correcting the first x-coordinate value based on the x-coordinate correction value;
    obtaining a second y-coordinate value by correcting the first y-coordinate value based on the y-coordinate correction value; and
    setting the second x-coordinate value and the second y-coordinate value as final coordinate values of the pixel.

7. The image registration method of claim 1, wherein the first image is taken by a first camera and the second image is taken by a second camera.

* * * * *